Nov. 12, 1963 S. A. RADLEY ETAL Re. 25,476

CIGARETTE MAKING APPARATUS

Original Filed Feb. 20, 1957 2 Sheets-Sheet 1

INVENTORS
SIDNEY A. RADLEY
PHILIP SPERGEL
By Anthony D. Cennamo

CIGARETTE MAKING APPARATUS

Original Filed Feb. 20, 1957 2 Sheets-Sheet 2

INVENTORS
SIDNEY A. RADLEY
PHILIP SPERGEL
By Anthony D. Cennamo

United States Patent Office

Re. 25,476

Reissued Nov. 12, 1963

25,476

CIGARETTE MAKING APPARATUS

Sidney A. Radley, Bells Corners, Ontario, Canada, and Philip Spergel, Lexington, Mass., assignors to Industrial Nucleonics Corporation Original No. 2,954,775, dated Oct. 4, 1960, Ser. No. 641,357, Feb. 20, 1957. Application for reissue July 12, 1961, Ser. No. 126,435
19 Claims. (Cl. 131—21)

Matter enclosed in heavy brackets [ ] appears in the original patent but forms no part of this reissue specification; matter printed in italics indicates the additions made by reissue.

This invention relates to cigarette making apparatus, and more specifically it relates to a new and improved cigarette making apparatus whereby the weight per unit length of the output cigarettes can be maintained substantially constant at any desired value.

The manufacture of cigarettes involves preparation of ripe tobacco by curing, shredding of the leaves, removal of coarse stems, moisturizing and otherwise variously conditioning the tobacco destined to form the filler of the finished cigarette. Eventually tobacco so prepared is delivered to the maker floor where it is distributed among a plurality of maker machines. At the maker, on demand a quantity of shredded tobacco is dumped into a hopper whence it passes into a power-driven carding section which disentangles the mass of tobacco shreds and an associated feed mechanism showers the tobacco uniformly onto a traveling endless belt. The resulting thin, continuous stream of tobacco shreds is then channeled onto a paper web fed from a reel. Since the paper thereof is that which forms the casing of the finished cigarette, the fragile web carrying the tobacco is supported on an endless folding belt which travels continuously through a folder, a rod former, a paster and a sealer, wherefrom there emerges a continuous elongated paper cylinder containing tobacco which is referred to as the cigarette rod. The rod is then fed into a cutter section wherein a rotary knife driven in proper timed relation to the movement of the rod cuts off individual cigarettes of a predetermined length which are carried away on a conveyor belt to a station where they are collected for final inspection and packaging.

It is highly desirable that the amount of tobacco contained in each finished cigarette should conform to a predetermined optimum weight. Since all cigarettes are of essentially the same diameter, too little tobacco results in a loosely packed cigarette which feels infirm, burns rapidly and unevenly, and smokes dry and hot to the taste. On the other hand, a cigarette containing too much tobacco will not draw freely and may not stay lighted. Furthermore, production of overfilled cigarettes consumes excess quantities of tobacco, with appreciable economic loss to the manufacturer.

In conventional cigarette making machines, the amount of tobacco contained in the finished cigarette is variable by some means which ordinarily comprises an adjustable power transmission device whereby the speed of the tobacco feed or carding section of the machine is variable relative to the main drive system; that is to say, the paper web is carried through the rod forming mechanism at a substantially constant speed, whereas the rate at which the tobacco is delivered onto the web may be regulated in order to control the weight of the finished cigarettes.

In the past such regulation has in general been effected manually, in accordance with the results of an occasional weighing of a sample group of cigarettes issuing from the maker. However, it has long been recognized that the consistency of results obtainable by this method leaves much to be desired, since a number of variables affect the weight of the output cigarettes causing cyclical and random changes therein on both a short term and long term basis. Examples of such variables which could be mentioned include changes in the handling qualities of the tobacco both within batches and from batch to batch, changes in atmospheric humidity conditions, the level of bulk tobacco in the hopper, wear on the mechanical parts of the maker machine, and inconsistent performance of the machine with a given control setting. Furthermore, the quality control inspector is ordinarily responsible for a number of machines, so that only intermittent attention can be given to each individual machine. Accordingly over several decades there is a history of repeated attempts to achieve continuous self-regulation of the cigarette making process. One of the earliest well-considered devices proposed to accomplish this purpose is described in U.S. Patent No. 1,864,728, issued June 28, 1932, to W. J. Hawkins et al., wherein a mechanical feeler was used to continuously sense the firmness of the cigarette rod for the purpose of actuating an automatic feedback controller. The inadequacy of this and other similar systems is attributed to the fact that it is essentially impossible to construct a mechanical gauging device capable of measuring the weight of a traveling cigarette rod with the consistently high accuracy required for satisfactory automatic weight control.

More recently attempts have been made to gauge cigarette weight by electrical means such as with a dielectric or capacitance gauge. The inadequacy of various proposed control systems incorporating these sensing elements is attributed mainly to the fact that such gauges are responsive to a number of extraneous chemical and physical properties other than mass; in particular it is found that they are much more sensitive to variations in moisture content of the tobacco than to the weight thereof.

Still more recently the availability of suitable beta-emitting radioisotopes has brought forth several attempts to utilize beta-ray absorption gauges as transducer elements in automatic cigarette weight control systems. Happily this technique is not characterized by a basic impracticability as is the case with the previous methods. Hence several devices now known in the art have utilized beta-ray gauges, with somewhat improved control circuitry, to bring about noticeably better regulation of the cigarette process than can be achieved by manual control methods. However, these devices are subject to various inherent difficulties which have prevented them from receiving any substantial acceptance by the industry. Essentially the degree of improvement effected in the process does not justify the extra expense involved in the purchase and maintenance of the measuring and control equipment. In particular, the problem of standardization of a nuclear measuring instrument has not been clearly understood nor properly solved. Hence such factors as changes in environmental conditions, the aging of tubes and other electronic components and radioactive source decay which inevitably deteriorate the accuracy of these instruments cannot be adequately compensated for by simple adjustments which can be performed by automatic means or manually by operating personnel. On the other hand, it is necessary to very frequently repeat original calibration procedures, which require considerably more skill and time-consuming effort than is generally realized if really accurate results are to be obtained, even with the best equipment and highly systematized procedures. It is obvious that the resulting increase in overhead expense is considerable in view of the number of cigarette makers employed in most manufacturing plants.

In an effort to minimize the effects of error-producing variables such as those above referred to, various expedients have been proposed such as the use of multiple radiation sources and detectors, the provision of "standard" or comparison absorbers designed in an attempt to simulate the radiation absorption characteristics of the cigarette rod, apparatus for conversion of signal voltages from D.C. to A.C. and back to D.C., and the like, which in practice only multiply the difficulties encountered in the basic apparatus and add to the expense of constructing and maintaining the same.

These and several other disadvantages of prior devices are effectively overcome in the system of the present invention, wherein there is provided a cigarette making apparatus incorporating a nuclear radiation gauge and an improved system of control to achieve a much needed, effective and reliable self-regulation of the cigarette making process.

Accordingly, it is an object of this invention to provide a new and improved cigarette making apparatus whereby the weight per unit length of the output cigarettes can be maintained substantially constant at any desired value.

It is another object to provide an effective, reliable and accurate means for automatically controlling a cigarette maker.

It is a further object to provide means for continuously and accurately measuring the weight per unit length of a traveling cigarette rod, and to provide an automatic control system responsive to the output of the measuring device for maintaining the weight of the rod constant at any desired predetermined value.

It is again an object to provide measuring and control apparatus, capable of fulfilling the above objects, which may be readily installed on existing cigarette makers without extensive modification thereof.

It is a still further object to provide apparatus in accordance with the above objects which is relatively inexpensive to manufacture, simple to operate, and which requires a minimum of adjustment and maintenance.

These and further objects and advantages of the invention will become more apparent upon reference to the following specification and appended drawing.

Figure 1:
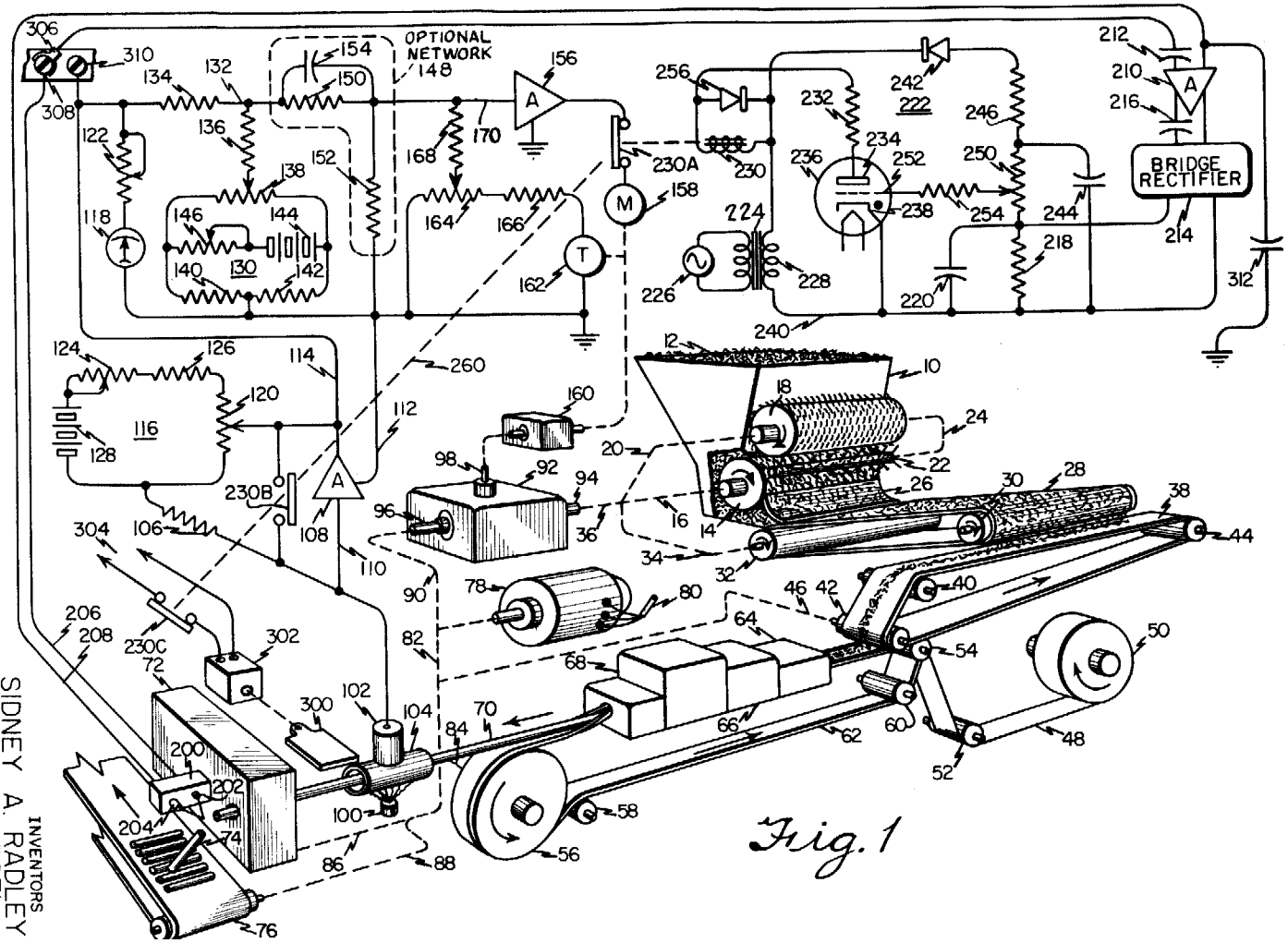
FIGURE 1 is a schematic showing of the electrical elements and gross mechanical features of a typical cigarette making apparatus in accordance with the present invention.

Referring now to FIGURE 1, the numeral 10 indicates a hopper containing a supply of shredded tobacco 12 which is periodically replenished as needed. A carding drum 14, which is driven to rotate clockwise through connection 16 by means hereinafter described, picks up tobacco from the bottom of the hopper 10 [12] whence the tobacco is carried over the top of the carding drum 14. At 18 is a carded rejector drum similarly driven clockwise through a suitable gear arrangement indicated by connection 20. The rejector drum 18 coacts with the drum 14 to disentangle and parallel the tobacco shreds carried over the drum 14 and also limits the rate of removal thereof from the hopper 10. At 22 is a picker roller driven counterclockwise by suitable gearing indicated by connection 24 which removes the tobacco from the carding drum 14 and showers it over the apron 26 onto a wide feed belt 28 whereon it is deposited in a thin layer as the feed belt 28 travels forward. The endless feed belt 28 is carried on spaced rollers as at 30 and 32 and driven through suitable gearing indicated by connection 34. The mechanism so far described will be referred to hereinafter as the tobacco feed, and it will be noted that all elements in this section are driven from a common power connection indicated at 36.

The tobacco carried on the feed belt 28 is now transferred onto another endless belt 38 which travels at right angles to the feed belt 28 and is supported on spaced rollers as at 40, 42 and 44 and driven through a mechanical connection indicated at 46. Whereas the tobacco on the feed belt 28 is dispersed into a wide thin layer; on the belt 38 it is gathered into a narrow and ribbonlike stream which is then transferred onto the paper web 48 which forms the casing of the cigarette rod. The web 48, supplied from a reel 50, passes under a guide roller 52 and over an end roller 54. The roller 54, together with the drum 56 and guide rollers 58 and 60, also carries an endless folding belt 62 which travels with the web 48 and supports the same together with the ribbon of tobacco transferred thereto from the belt 38. In this manner the paper and tobacco are carried into a rod former 64 which has associated therewith a paster 66 and a sealer 68. The cigarette rod 70 emerges from the rod former and passes into the cutter section 72, whereas the folding belt 62 is returned around the drum 56. Individual cigarettes as at 74 of predetermined length issue from the cutoff device 72 and are taken on a conveyor belt 76 to a collection point.

Mechanical power for driving the cigarette maker is furnished from a suitable source represented by the electric motor 78, which is supplied with electrical power through leads 80. Through suitable gears or other arrangement, the motor 78 drives the main portions of the maker at relatively constant speed. Thus by way of a common connection 82, the belt 38 is driven through connection 46; the rod forming mechanisms including the folding belt 62 and the drum 56 are driven through connection 84; the cutoff device 72 is driven through connection 86, and the conveyor belt 76 is driven through connection 88, so that these units operate at mutually suitable fixed speed ratios or in suitable fixed timed relation to one another. The tobacco feed mechanism, however, which is driven through a common connection 36, receives power from the motor 78 through connection 90 and a variable speed ratio transmission 92 whereby the speed of the tobacco feed may be altered in relation to the speed of the main portion of the maker. The ratio of the speed of the output shaft 94 to the speed of the input shaft 96 is variable over a continuum according to the angular position of the control shaft 98. As will be set forth in the explanation hereinafter provided, the positioning of the control shaft 98 is effected automatically in accordance with measured deviations in the weight per unit length of the cigarette rod.

It is appropriate here to observe that the control system of the present invention does not depend for accuracy on reproducibility of the ratio of input to output speeds for any given setting of the control shaft 98. However, it is highly desirable that a given incremental change in the setting of the control shaft 98 should result in a definite incremental change in the speed ratio, and furthermore the adjusting mechanism should be positive acting, without exhibiting excessive backlash or other erratic action such as has been characteristic of most variable ratio drives employed on cigarette makers in the past. A number of suitable transmissions are presently available; for example, a device manufactured and marketed by the Cleveland Worm and Gear Company of Cleveland, Ohio, under their trade name of Speed Variator has been found satisfactory for this application.

Figure 2:
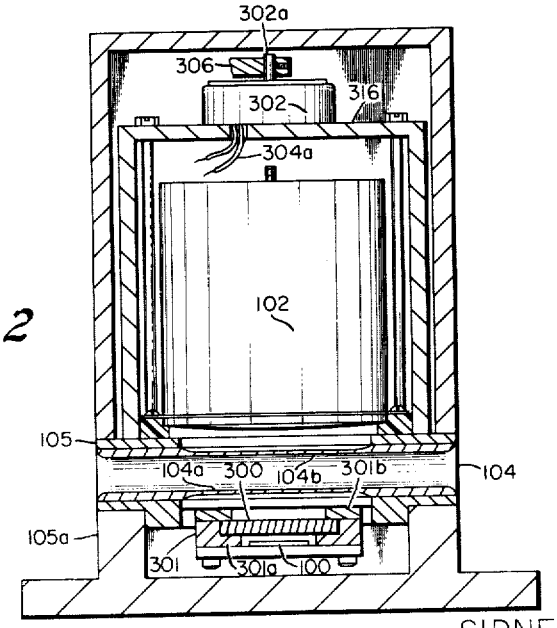
FIGURE 2 is a sectional view of a radiation source and detector unit, illustrating in more detail the mechanical relationship of parts shown in FIGURE 1.

The measuring device of this invention utilizes a suitable source of penetrative radiation indicated at 100 which comprises a hermetically sealed capsule containing a radioactive material which emits beta rays of a suitable energy spectrum, e.g., strontium 90. The radiation detector 102 may be any suitable radiation detector such as an ionization chamber, which is preferred for the purpose at hand. The traveling cigarette rod is guided through a pass tube 104, which provides a continuous closed metal surface adjacent the cigarette rod. As shown in FIGURE 2, the outer periphery of the pass tube is sealingly secured in a suitable housing 105 which together with the attached base plate 105a surrounds and supports the source and detector. Effective metal barriers are thus provided between the radiation source capsule and the cigarette rod as one of many precautions used to prevent any possibility of contamination of the product with a radioactive substance. The source and detector are preferably located on diametrically opposite sides of the pass tube 104, and suitable thin-walled portions 104a and 104b are provided in the pass tube adajcent the source and detector to permit passage of a sufficient number of beta particles to effect measurement of the rod. As is known, the absorption of beta radiation depends on the mass of material intercepting the radiation beam, so that the number of beta particles reaching the detector 102 is essentially an inverse function of the weight of the tobacco in the cigarette rod. Since the length of the detector disposed parallel to the movement of the rod is constant, the response of the detector is a function of weight per unit length of the rod.

Basically, the automatic regulating system of this invention comprises an accurate weight gauge, an automatic controller responsive to the readings thereof and a monitor system responsive to the output of the maker for governing the application of automatic control to the process.

The gauge includes the source 100, detector 102, resistor 106, a feedback amplifier 108, a calibrating and standardizing network 116 and an indicating and/or recording device 118.

The controller comprises a comparator network 130, an optional lead network indicated by the dotted line 148, and an integrating velocity servo system 156—170 including a gear reducer 160 through which the servo motor 158 may regulate the speed ratio of the variable ratio transmission 92. The monitor device will be fully described hereinafter.

The electrical output signal developed by the detector 102 is a minute current which flows through a resistor 106 having a very high impedance. A voltage proportional to current through the detector 102 is thereby developed across resistor 106, and this signal is utilized by the measuring system of the gauge to provide an indication of the weight of the cigarette rod passing betwen the source 100 and the detector 102.

The measuring system comprises a feedback amplifier 108 with an input on line 110 and ground reference 112; a calibrating and standardizing network indicated generally at 116, and the weight indicator 118. In operation the signal voltage developed across resistor 106 is compared with a fixed opposing voltage from the network 116, this latter voltage always being added algebraically to the signal voltage so that the amplifier responds to the difference. The output of the amplifier on line 114 is coupled back to the input 110 through the network 116 and resistor 106, so as to maintain the amplifier input at substantially zero or ground potential at all times. Thus the amplifier output voltage between line 114 and ground is automatically maintained equal to the difference between the voltage developed across resistor 106 and the fixed voltage from the network 116. The amplifier 108 therefore performs an impedance matching function in transforming a high impedance signal into a robust signal for operating the controller and the indicating meter 118, and this is accomplished without appreciable distortion of the signal, through the agency of the substantially total inverse feedback arrangement. The indicator 118 is responsive to any output voltage from the amplifier 108, and its pointer will be deflected to either side of its zero center position depending on the polarity of this output.

It can be seen that the calibrating potentiometer 120 provides an adjustment whereby the zero center position of the indicator 118 can be made to correspond to any selected value of cigarette weight which it is desired to place at the center of the scale associated with the indicator. Potentiometer 122 is provided to allow an adjustment of the span of weight deviations, on each side of the center value, which are readable on the indicator scale. Thus the indicator scale may be calibrated directly in any desired units of weight per unit length such as on a reciprocal scale indicating cigarettes per four ounces. Potentiometer 124 and resistor 126 determine the portion of the voltage from the voltage source 128 which is available across potentiometer 120 to provide the opposing voltage in the measuring system. Potentiometer 124 is therefore the means of standardizing the gauge so that the total voltage available across potentiometer 120 may be restored at any time to the exact value of the maximum voltage across resistor 106 when no material is interposed between the source 100 and the detector 102.

The measuring system briefly described above is the subject to *U.S. Patent No. 2,965,847, issued December 20, 1960, to Sidney A. Radley* [co-opending application Serial No. 628,999, filed December 18, 1956, by Sidney A. Radley], and accordingly the full details thereof are not included in this specification.

The voltage output of the amplifier 108 which appears on line 114 is indicative of the weight of cigarette rod passing between the source 100 and the detector 102. This signal, which energizes the weight indicator 118, also provides the input to the automatic controller. The network 130 provides a voltage signal representative of the desired weight of the cigarette rod. This voltage is continuously added algebraically to the voltage signed representing the measured weight of the rod, so that the difference voltage appearing on line 132 at the junction of resistors 134 and 136 is a signal representing the direction and magnitude of the error in the measured weight of the cigarette rod.

The selected weight of the cigarette rod 70 which is desired to be maintained constant by the automatic controller may be preset by means of potentiometer 138 in the network 130, that is, the setting of this potentiometer determines the direction and magnitude of the comparison voltage representing the desired weight. The bridge circuit 130, comprising potentiometer 138 and a pair of identical precision resistors 140 and 142, is energized by a voltage source represented by the battery 144. The voltage available across the bridge is adjustable by means of potentiometer 146. The potentiometer 138 may therefore be equipped with a graduated dial and calibrated directly in any desired units of weight per unit length to agree with the scale of the weight indicator 118. This provides a direct reading indication of the setting of the control point, independent of the calibration of the weight indicator 118.

The error signal appearing on line 132 may be passed through an optional lead network indicated by the dotted line 148, comprising resistors 150 and 152 and capacitor 154, whose purpose will be explained hereinafter. The error signal provides an input voltage to the servo amplifier 156 which energizes the servo motor 158. The motor 158 drives the control shaft 98 of the variable ratio transmission 92 through reduction gears 160. The servo motor 158 also drives a tachometer generator 162 which develops a D.C. voltage having a polarity in accordance with its direction of rotation and a magnitude proportional to its speed. The tachometer output voltage appears across the voltage divider network of potentiometer 164 and resistor 166. Depending on the setting of pottentiometer 164, a portion of the tachometer voltage is fed back through resistor 168 to the input of the servo amplifier 156 in opposition to the error signal voltage.

The servo amplifier 156 is designed to have an almost infinite forward gain so as to saturate on a very small input signal. If the input voltage representing an error in measured cigarette weight has a certain polarity, the servo motor 158 will be driven with full acceleration in one direction. If the error voltage has the opposite polarity, the motor will accelerate in the opposite direction. The motor will continue to accelerate until the voltage derived from the tachometer 162 becomes equal and opposite to the error signal, at which time the input to the servo amplifier on line 170 is reduced to zero. At any greater speed the tachometer output through resistor 163 would become larger than the error signal, so that the input to the servo amplifier 156 would have the opposite polarity, tending to energize the servo motor 158 to drive in the opposite direction. It can be seen that by this means the speed of the servo motor 158 and the rate of readjustment of the speed ratio between the main drive shaft 90 and the tobacco feed section drive shaft 36 is maintained instantaneously proportional to the magnitude and direction of the error in the measured weight of the cigarette rod. Therefore, over any given period of time, the total amount of adjustment applied to the control shaft 98 is proportional to the time integral of the error signal received over the same period of time.

The rate of correction to the control shaft 98 per unit of error in measured cigarette weight is referred to as the "gain" of the control system. The maximum available gain of the system is dependent on the ratio selected for the speed reduction gears 160. The gain is variable over a suitable range by adjusting potentiometer 164, which determines the portion of the tachometer voltage which is fed back to cancel the error signal. Potentiometer 164 therefore determines the speed of the servo motor 158 which will be maintained for a given amount of error in cigarette weight.

The maximum permissible gain of the control system is definitely limited by transportation lag, that is, the length of time required for the effect of a step change in the setting of shaft 98 to be observed as a change in weight of the cigarette rod 70 passing between the source 100 and the detector 102. If the gain is set too high, an existing error will be over-corrected before the gauge is able to "see" that sufficient correction has already been applied. Hence the cigarette making process is caused to "cycle" or perform forced oscillations around the desired cigarette weight. On the other hand, it is desirable to keep the gain as high as possible to secure optimum performance from the controller.

In addition to transportation lag, there may be other forms of delays or combinations of delays in various types and models of commercial cigarette makers. Examples of such delays, existent to a greater or lesser degree in diffeernt machines, are friction, mechanical inertia, or electrical delays such as inductance in field and/or armature circuits of a motor which is speed controlled. In many machines it is found that the carding drum 14 and other dynamic elements geared thereto is the source of considerable inertial delay in its response to the continual accelerations required to maintain good uniformity of the cigarette rod. It can be seen that a drive system as illustrated using a common power source as at 78 to furnish power for the entire machine has an advantage since the weight of the cigarette rod is dependent on the ratio of the speeds of the tobacco feed and the main drive rather than the absolute speed of either. Thus the inertial delay of the tobacco feed is reflected back through the transmission 92 to the main drive, so that if the motor 78 does not have sufficient power to instantaneously effect a required acceleration of the tobacco feed there is a momentary deceleration of the rod forming mechanism. Assuming no slippage in the drive system, this means that an adjustment to the control shaft 98 results in an appropriate and immediate change in the speed ratio regardless of inertial delay. In some cigarette makers the drum 56 which carries the folding belt 62 has considerable inertia and is thereby able to assist the motor 78 in maintaining a relatively constant speed of the maker output regardless of speed changes required of the tobacco feed. Under these circumstances the delay compensation network enclosed by the dotted line 148 is frequently dispensed with. It is apparent, however, that a number of other drive arrangements may be either permissible or required in certain instances and that these other arrangements are quite within the scope and range of equivalency of this invention. For example, separate motors may be utilized to drive the tobacco feed and the main section of the machine, with the main shaft 82 being driven by a constant speed motor and the tobacco feed drive shaft 36 being driven by a variable speed drive motor; the speed control thereof being regulated by the automatic controller in the same manner as the shaft 98 of the transmission 92 of the illustrated embodiment. In this instance there is an inherent delay in response to any adjustment of the tobacco feed speed relative to the constant speed of moving parts associated with the main maker drive, for reasons above referred to.

A method of compensating for delays of this type is to provide a momentary over-correction for any rapid change in the observed error, and a means of accomplishing this result is the provision of the lead network comprising resistors 150 and 152 and the capacitor 154. Where a constant error signal is present, the signal is divided by resistors 150 and 152 so that the portion of the signal across resistor 150 is not available as an input to the velocity servo. However, if there is a rapid change in the value of the error signal, the potential change is bypassed around resistor 150 through capacitor 154, so that a signal approaching the entire voltage change appears momentarily across resistor 152 alone as an input to the servo system. As a result, it may be said that the controller momentarily observes and attempts to correct for a larger error than actually exists in the measured weight of the cigarette rod. The extra signal voltage may then decay according to the time constant of resistors 150 and 152 and capacitor 154, so that the over-adjustment of the speed control effected by the presence of the lead network may be corrected when the error signal approaches a steady state value.

The automatic controller above described is the subject of *U.S. Patent No. 2,955,206, issued October 4, 1960, to* [a copending application Serial No. 641,414, filed February 20, 1957 by] Philip Spergel and Sidney A. Radley and accordingly the full details thereof are not included in this specification.

At times it is unnecessary or undesirable for the controller to make any correction to the feed mechanism even though the measuring device indicates a deviation from the desired weight as set on the dial associated with potentiometer 138. For example, when the maker is first started and the cigarette rod issuing from the forming mechanism is imperfect, the operator diverts the rod into a scrap bin rather than allowing it to pass through the gauge or the cutter section. Under this circumstance the gauge would see insufficient weight and the controller would speed up the tobacco feed unnecessarily to a maximum. In another case the rod may break when the machine is unattended, leaving a section of the broken rod in the pass tube of the gauge. If it should happen that the weight of the rod section is off specification, the controller would again unnecessarily speed up or slow down the feed to the permissible limit.

Accordingly, it is desirable to provide automatic means for interrupting the measurement and control functions whenever normal production of cigarettes is discontinued for any reason. Such means may employ any one of several possible types of maker output sensing devices. One preferred form illustrated utilizes a photoelectric detector 200 on the output of the cutter section 72.

The detector 200 employs a light source 202 and a light sensitive element 204 which may comprise a cadmium selenide cell mounted in position to receive light from the source 202 which has been reflected from individual cigarettes issuing from the cutter 72. The passage of cut cigarettes at spaced intervals produces a fluctuating intensity of the light falling on the photoelectric cell 204, resulting in a fluctuating electrical signal output from the detector 200. This output signal is applied through leads 206 and 208 to the input of an amplifier 210. A capacitor 212 in series with the input to amplifier 210 passes only the A.C. component of the signal to the amplifier. The A.C. component of the amplifier output is fed to a bridge rectifier 214 through capacitor 216. The output of the rectifier is a unidirectional voltage which appears across resistor 218 and is filtered by capacitor 220. Indicated generally by the numeral 222 is a thyratron-controlled relay circuit which is provided to switch the measurement and control functions on and off in accordance with the magnitude of the voltage across resistor 218, which in turn is essentially a function of the rate at which the light beam reaching the photoelectric cell 204 is modified in intensity.

Power for energizing the circuit 222 is derived from a transformer 224 which is energized from the conventional 115 v. A.C. source 226. A series connected circuit across the secondary winding 228 of transformer 224 includes the coil of a control relay 230, resistor 232 and the plate (234) circuit of thyratron 236 whose cathode 238 is connected to a common line 240 leading from the other side of the secondary transformer winding 228. Transformer winding 228 also energizes a grid bias voltage supply comprising a rectifier 242 and capacitor 244, with associated dropping resistors 246, potentiometer 250 and resistor 218. The negative bias voltage thus provided for the grid 252 of the thyratron 236 is applied thereto through a conventional grid stopper resistor 254 connected to the wiper arm of potentiometer 250 whereby the magnitude of the grid bias voltage may be varied to suit the desired operating point of the relay control circuit. As previously indicated, the output of the bridge rectifier 214 develops across resistor 218 a voltage in opposition to the fixed bias voltage. If the rectified output is of sufficient magnitude, the bias on the grid is reduced below the ignition point of tube 236, which then conducts current so as to hold the relay 230 energized. Since the tube 236 conducts only on alternate half cycles of the supply voltage, a rectifier 256 is connected in the conventional manner across the coil of relay 230 to stabilize the operation thereof.

It should be noted that the contacts 230a, 230b and 230c of relay 230 are herein shown in the relay energized position which obtains when the maker is producing its normal output of cigarettes and the thyratron 236 is conducting. In most cases, potentiometer 250 is set so that relay 230 will be de-energized when the rate of ejection of cigarettes from the cutter 72 is about half the normal rate of production. This allows contacts 230a to open, disconnecting the output of the servo amplifier 156 from the motor 158, preventing further automatic adjustment to the tobacco feed. Contacts 230b short-circuit the input to the feed-back amplifier 108 in the measuring system to discontinue measurement of the detector output. It will be understood that the function of contacts 230b should be performed by a special relay which will be energized in cascade fashion when relay 230 is de-energized, but in the simplified drawing herein shown it is considered sufficient to represent this interaction by the dashed line 260.

At 300 there is represented a shutter which is provided to cover the radiation source whenever the gauge is not in operation, said shutter being utilized to minimize any possible health hazard to personnel working in the vicinity of the source detector housing 105 which encloses the radiation source 100. The shutter 300 is slideably mounted in a supporting block 301 having a pair of laterally extending milled stepped portions as at 301a to provide a bearing surface for the shutter, which is movably retained in the ways thus provided by means of an apertured, shielding cover plate 301b. Movement of the shutter between its open and closed positions is actuated by an electrical solenoid 302 having an integral return spring (not shown) which urges the shutter toward the closed position. When the gauge is operating, the shutter 300 is held open against the spring tension by the solenoid, which is energized by a suitable source of electrical voltage connected to the leads 304.

Figure 3:
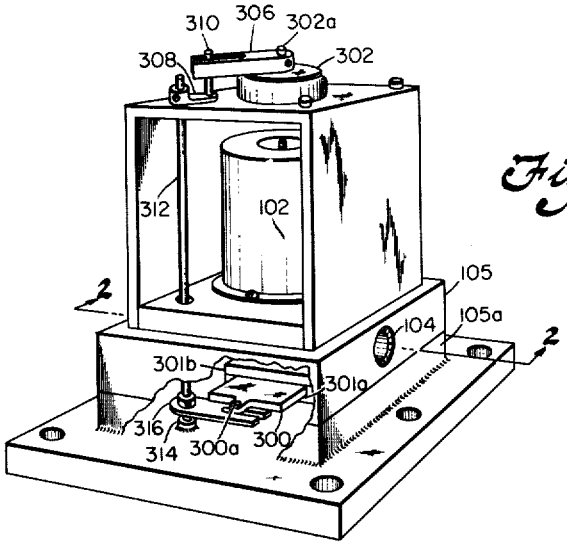
FIG. 3 is a perspective view of the source and detector unit of FIG. 2 with the cover removed, showing mechanical details of the radiation shutter actuating linkage.

The shutter actuating mechanism is depicted in FIG. 3, wherein it is seen that the solenoid 302 is preferably of the rotary type having a slotted arm 306 secured to the actuator shaft 302a thereof. The arm 306 actuates a bell crank lever 308 which carries a crank pin 310 extending upwardly into the slot of the arm. The crank lever is in turn secured to a vertical shaft 312 which extends downwardly and is journaled at its lower end in a suitable bushing 314 pressed into a bored opening in the base plate 105a. A similar bushing (not shown) supports the upper end of the shaft 312 in the U-shaped solenoid support member 316. Secured to the lower end of shaft 312 is a slotted arm 316 which engages a downwardly extending pin 300a which is secured, by staking or other suitable means, in the eyelet of the shutter 300. By means of this linkage, rotary movement of the solenoid shaft is converted to rectilinear motion of the shutter between its open and closed positions.

Referring again to FIG. 1, the solenoid energizing circuit is interrupted by contacts 230c when the relay 230 is deenergized in the manner previously explained, allowing the spring to close the shutter over the radiation source. It is apparent that when the rate of cigarette production is returned to normal, relay 230 will again become energized, allowing the shutter 300 to be opened, the gauge to resume measurement, and automatic control action to be restored.

In many cigarette manufacturing plants it is customary to provide a linear measurement device on the output of the rod former in order to tally the production of different machines or work shifts on an automatic register. This register or counter is driven by a wheel in tractive engagement with the cigarette rod 70. Hence it is sometimes more convenient to drill a series of spaced holes in the disc of this wheel and to mount the light source 202 and photo-cell 204 on opposite sides thereof. This provides an equivalent means of obtaining a suitable signal dependent on the production rate.

In other instances it has been found satisfactory to utilize a signal derived from slight normally uncontrollable short term variations in the weight of the measured cigarette rod to provide an indication of normal movement of the rod through the pass tube 104 of the gauge. That is to say, the time constant characteristics of the feedback amplifier 108 may be selected so that the output of the amplifier on line 114 contains short-term random and cyclical voltage variations reflecting the rapid statistical weight fluctuations in the cigarette rod. Due to the inherent mechanical and/or electrical damping of the indicator 118, these very rapid voltage fluctuations do not seriously affect the readings thereon but may be utilized to actuate the relay system 222. Accordingly if the lead 306 on terminal 308 is transferred to terminal 310 it is seen that the output of the measuring feedback amplifier 108 on line 114 may be coupled to the monitor relay amplifier 210 through capacitors 212 and 312. In this way weight fluctuations in the cigarette rod provide an A.C. signal for operating the relay system 222 in the same manner as the fluctuating intensity of light falling on the photo-cell 204 provide a similar signal as was previously described.

While this invention has been described and illustrated in typical and preferred form, with certain alternative embodiments thereof specifically suggested, it should be expressly understood that the invention is by no means limited to the precise embodiments so illustrated or suggested, since obviously a great many modifications can be made without departing from the scope of the appended claims.

What is claimed is:

1. Cigarette making apparatus comprising a tobacco feed for metering a continuous stream of shredded tobacco onto a traveling paper web, a cigarette rod forming mechanism for fabricating said tobacco and said paper web into a continuous cigarette rod, a first driving means for driving said tobacco feed, a second driving means for driving said rod forming mechanism, adjusting means for varying the ratio of the speeds of said first and second driving means thereby to vary the weight per unit length of said cigarette rod; mass sensing means mounted near the cigarette rod output side of said rod forming mechanism, said mass sensing means comprising a radioactive source of penetrative radiation, a radiation detector, and means for guiding said cigarette rod in spaced measuring relation to said source and detector; means responsive to the electrical output of said detector for producing a first electrical signal indicative of the weight per unit length of said cigarette rod, adjustable means including a voltage source for producing a second electrical signal indicative of a pre-determined weight per unit length, control means responsive to the difference between said first and second electrical signals for actuating said adjusting means for varying the ratio of the speeds of said first and second driving means so as to maintain the weight per unit length of said cigarette rod substantially constant, cutter means for severing individual cigarettes from said cigarette rod, means connecting said second driving means to said cutter means for driving the same, a light source mounted adjacent said cutter for directing a light beam across the path of said individual cigarettes so as to generate a pulsating light ray as a result of the periodic interruption of said light beam by said individual cigarettes, means including a photo-electric detector intercepting said pulsating light ray for generating an electrical voltage having a pulsation rate proportional to the rate of discharge of said individual cigarettes from said cutter, an operating circuit for said control means, and adjustable electronic relay means for completing said operating circuit only when said pulsation rate exceeds an adjusted value.

2. Apparatus as in claim 1 wherein said second driving means comprises a source of mechanical power coupled to said rod forming mechanism for driving the same at a predetermined speed, and wherein said first driving means comprises a variable speed transmission device having input and output shafts, said input shaft being coupled to said power source and said output shaft being coupled to said tobacco feed.

3. Cigarette making apparatus comprising a tobacco feed for metering a continuous stream of shredded tobacco onto a traveling paper web, a cigarette rod forming mechanism for fabricating said tobacco and said paper web into a continuous cigarette rod, a source of mechanical power, means for coupling said rod forming mechanism to said power source to drive the same at essentially constant speed; a variable speed transmission device having an input shaft, an output shaft, and adjusting means for varying the ratio of the speeds of said input and output shafts; means for coupling said input shaft to said power source, means for coupling said output shaft to said tobacco feed for driving the same; mass sensing means mounted near the cigarette rod output side of said rod forming mechanism, said mass sensing means comprising a radioactive source of penetrative radiation, a radiation detector, and means for guiding said cigarette rod in spaced measuring relation to said source and detector; electrical impedance means connected to said detector for producing a first electrical signal proportional to electrical current through said detector, an electrical network including a voltage source for producing a second electrical signal opposing said first electrical signal; a measuring amplifier responsive to the difference between said first and second electrical signals, said measuring amplifier having an input and an output; a feedback loop including said high impedance and said electrical network connecting the output of said measuring amplifier to the input thereof so as to maintain said input at substantially zero potential, means responsive to any output voltage from said measuring amplifier for indicating the weight per unit length of said cigarette rod, adjustable means for selecting a value of said output voltage corresponding to a desired value of said indicated weight per unit length, circuit means for comparing said output voltage with said selected value to derive a control voltage indicative of the algebraic difference therebetween, a servo motor, means connected to said servo motor for generating a rate signal voltage indicative of the direction and speed of operation of said servo motor, a servo amplifier having an output adapted to drive said servo motor and a control input for regulating said driving output so as to control the direction of operation of said servo motor, adjustable circuit means for connecting said control voltage and said rate signal voltage in mutual opposition to said control input of said servo amplifier, and mechanical means connecting said servo motor to said speed ratio adjusting means for said transmission device.

4. Cigarette making apparatus comprising a tobacco feed for metering a continuous stream of shredded tobacco onto a traveling paper web, a cigarette rod forming mechanism for fabricating said tobacco and said paper web into a continuous cigarette rod, a first driving means for driving said tobacco feed, a second driving means for driving said rod forming mechanism, adjusting means for varying the ratio of the speeds of said first and second driving means thereby to vary the weight per unit length of said cigarette rod; mass sensing means mounted near the cigarette rod output side of said rod forming mechanism, said mass sensing means comprising a radioactive source of penetrative radiation, a radiation detector, and means for guiding said cigarette rod in spaced measuring relation to said source and detector; a measuring system comprising a feedback amplifier and an electrical network for converting the output of said detector into a first electrical voltage indicative of the weight per unit length of said cigarette rod, adjustable means including an electrical network for producing a second electrical voltage indicative of a predetermined value of weight per unit length, circuit means for combining said first and second electrical voltages to produce a third electrical voltage having a polarity and amplitude indicative of the algebraic difference therebetween, a servo motor for actuating said adjusting means for varying said ratio of the speeds of said first and second driving means, a servo amplifier having a control input and an output adapted to drive said servo motor at substantially full power with any direct current voltage applied to said control input, the polarity of said applied voltage determining the direction of rotation of said servo motor, means energized by said servo motor for generating a fourth electrical voltage having a polarity and amplitude respectively determined by the direction and speed of operation of said motor, adjustable circuit means for combining portions of said third and fourth voltages in mutual opposition to produce a control voltage indicative of the algebraic difference therebetween, and means connecting said control voltage to said control input of said servo amplifier.

5. Cigarette making apparatus comprising a tobacco feed for metering a continuous stream of shredded tobacco onto a traveling paper web, a cigarette rod forming mechanism for fabricating said tobacco and said paper web into a continuous cigarette rod, a first driving means for driving said tobacco feed, a second driving means for driving said rod forming mechanism, adjusting means for varying the ratio of the speeds of said first and second driving means thereby to vary the weight per unit length of said cigarette rod, guide means mounted near the cigarette rod output side of said rod forming mechanism for defining the path of said cigarette rod, a radioactive source mounted in spaced relation to said guide means for directing a beam of penetrative radiation across said path of said cigarette rod, a shutter having at least one portion substantially opaque to said radiation beam, bearing means for supporting said shutter for movement between a first position intercepting said radiation beam and a second position withdrawn from said radiation beam, actuating means for driving said shutter, a radiation detector mounted adjacent said guide means in position to receive a radiation issuing from said cigarette rod, means responsive to the electrical output of said detector for producing a first electrical signal indicative of the weight per unit length of said cigarette rod, adjustable means including a voltage source for producing a second electrical signal indicative of a predetermined weight per unit length, control means responsive to the difference between said first and second electrical signals for actuating said adjusting means for varying the ratio of the speeds of said first and second driving means so as to maintain the weight per unit length of said cigarette rod substantially constant, means for generating a fluctuating electrical voltage indicative of the linear rate of formation of said cigarette rod, means responsive to a major reduction in the alternating component of said fluctuating voltage for interrupting the action of said control means, and means associated with said interrupting means for controlling the operation of said actuating means thereby to place said shutter in said first position when the action of said control means is interrupted.

*6. Cigarette making apparatus comprising supply means for feeding a continuous stream of shredded tobacco onto a traveling paper web, a cigarette rod forming mechanism for fabricating said tobacco and said paper web into a continuous cigarette rod, cutter means for severing individual cigarettes from said cigarette rod; radiation means mounted adjacent said cutter means for directing a radiation beam toward the path of said individual cigarettes to generate pulsating radiation as a result of the periodic effects of said individual cigarettes on said radiation beam, a detector for detecting said pulsating radiation to generate a pulsating electrical voltage having a pulsation rate proportional to the rate of discharge of said individual cigarettes from said cutter means, and utilization means for utilizing said pulsating electrical voltage to control the operation of said cigarette making apparatus.*

*7. Cigarette making apparatus comprising supply means for feeding a continuous stream of shredded tobacco onto a traveling paper web, a cigarette rod forming mechanism for fabricating said tobacco and said paper web into a continuous cigarette rod, cutter means for severing individual cigarettes from said cigarette rod; light source means mounted adjacent said cutter means for directing a light beam toward the path of said individual cigarettes to generate pulsating light radiation as a result of the periodic effect of said individual cigarettes on said light beam, a photoelectric detector for detecting said pulsating light radiation to generate a pulsating electrical voltage having a pulsation rate proportional to the rate of discharge of said individual cigarettes from said cutter means, and utilization means for utilizing said pulsating electrical voltage to control the operation of said cigarette making apparatus.*

*8. Cigarette making apparatus comprising supply means for feeding a continuous stream of shredded tobacco onto a traveling paper web, a cigarette rod forming mechanism for fabricating said tobacco and said paper web into a continuous cigarette rod; mass sensing means being mounted adjacent the cigarette rod output side of said rod forming mechanism, control means responsive to said mass sensing means for controlling the amount of tobacco in said rod; cutter means for severing individual cigarettes from said cigarette rod; radiation means mounted adjacent said cutter means for directing a radiation beam toward the path of said individual cigarettes to generate pulsating radiation as a result of the periodic effect of said individual cigarettes on said radiation beam, a detector for detecting said pulsating radiation to generate a pulsating electrical voltage having a pulsation rate proportional to the rate of discharge of said individual cigarettes from said cutter means, and adjustable actuating means connected to said control means and responsive to said pulsating electrical voltage for maintaining said control means active only when said pulsation rate exceeds a given value.*

*9. Cigarette making apparatus comprising supply means for feeding a continuous stream of shredded tobacco onto a traveling paper web, a cigarette rod forming mechanism for fabricating said tobacco and said paper web into a continuous cigarette rod; mass sensing means being mounted adjacent the cigarette rod output side of said rod forming mechanism, control means responsive to said mass sensing means for controlling the amount of tobacco in said rod; cutter means for severing individual cigarettes from said cigarette rod; light source means mounted adjacent said cutter means for directing a light beam toward the path of said individual cigarettes to generate pulsating light radiation as a result of the periodic effect of said individual cigarettes on said light beam, a photoelectric detector for detecting said pulsating light radiation to generate a pulsating electrical voltage having a pulsation rate proportional to the rate of discharge of said individual cigarettes from said cutter means, and adjustable actuating means connected to said control means and responsive to said pulsating electrical voltage for maintaining said control means active only when said pulsation rate exceeds a given value.*

*10. Cigarette making apparatus comprising supply means for feeding a continuous stream of shredded tobacco onto a traveling paper web, a cigarette rod forming mechanism for fabricating said tobacco and said paper web into a continuous cigarette rod; mass sensing means including a radioactive source of penetrative radiation and a radiation detector, said mass sensing means being mounted adjacent the cigarette rod output side of said rod forming mechanism; cutter means for severing individual cigarettes from said cigarette rod; radiation means mounted adjacent said cutter means for directing a radiation beam toward the path of individual cigarettes to generate pulsating radiation as a result of the periodic effect of said individual cigarettes on said radiation beam, a detector for detecting said pulsating radiation to generate a pulsating electrical voltage having a pulsation rate proportional to the rate of discharge of said individual cigarettes from said cutter means, and utilization means for utilizing said pulsating electrical voltage to control the operation of said cigarette making apparatus.*

*11. Cigarette making apparatus comprising supply means for feeding a continuous stream of shredded tobacco onto a traveling paper web, a cigarette rod forming mechanism for fabricating said tobacco and said paper web into a continuous cigarette rod; mass sensing means including a radioactive source of penetrative radiation and a radiation detector, said mass sensing means being mounted adjacent the cigarette rod output side of said rod forming mechanism; cutter means for severing individual cigarettes from said cigarette rod; light source means mounted adjacent said cutter means for directing a light beam toward the path of individual cigarettes to generate pulsating light radiation as a result of the periodic effect of said individual cigarettes on said light beam, a detector for detecting said pulsating light radiation to generate a pulsating electrical voltage having a pulsation rate proportional to the rate of discharge of said individ-*

*ual cigarettes from said cutter means, and utilization means for utilizing said pulsating electrical voltage to control the operation of said cigarette making apparatus.*

*12. Cigarette making apparatus comprising supply means for feeding a continuous stream of shredded tobacco onto a traveling paper web, a cigarette rod forming mechanism for fabricating said tobacco and said paper web into a continuous cigarette rod; mass sensing means including a radioactive source of penetrative radiation and a radiation detector, said mass sensing means being mounted adjacent the cigarette rod output side of said rod forming mechanism, control means connected to said detector for controlling the amount of tobacco in said rod; cutter means for severing individual cigarettes from said cigarette rod; radiation means mounted adjacent said cutter means for directing a radiation beam toward the path of said individual cigarettes to generate pulsating radiation as a result of the periodic effect of said individual cigarettes on said radiation beam, a detector for detecting said pulsating radiation to generate a pulsating electrical voltage having a pulsation rate proportional to the rate of discharge of said individual cigarettes from said cutter means, and adjustable actuating means connected to said control means and responsive to said pulsating electrical voltage for maintaining said control means active only when said pulsation rate exceeds a given value.*

*13. Cigarette making apparatus comprising supply means for feeding a continuous stream of shredded tobacco onto a traveling paper web, a cigarette rod forming mechanism for fabricating said tobacco and said paper web into a continuous cigarette rod; mass sensing means including a radioactive source of penetrative radiation and a radiation detector, said mass sensing means being mounted adjacent the cigarette rod output side of said rod forming mechanism, control means connected to said detector for controlling the amount of tobacco in said rod; cutter means for severing individual cigarettes from said cigarette rod; light source means mounted adjacent said cutter means for directing a light beam toward the path of said individual cigarettes to generate pulsating light radiation as a result of the periodic effect of said individual cigarettes on said light beam, a photoelectric detector for detecting said pulsating light radiation to generate a pulsating electrical voltage having a pulsation rate proportional to the rate of discharge of said individual cigarettes from said cutter means, and adjustable actuating means connected to said control means and responsive to said pulsating electrical voltage for maintaining said control means active only when said pulsation rate exceeds a given value.*

*14. Cigarette making apparatus comprising supply means for feeding a continuous stream of shredded tobacco onto a traveling paper web, a cigarette rod forming mechanism for fabricating said tobacco and said paper web into a continuous cigarette rod; mass sensing means including a radioactive source of penetrative radiation and a radiation detector, said mass sensing means being mounted adjacent the cigarette rod output side of said rod forming mechanism; a shutter having at least one portion substantially opaque to said radiation, actuating means for moving said shutter between a first position intercepting said radiation and a second position withdrawn from said radiation; means for generating a fluctuating electrical voltage indicative of the formation of said cigarette rod, and means connecting said fluctuating electrical voltage to said actuating means.*

*15. Cigarette making apparatus comprising supply means for feeding a continuous stream of shredded tobacco onto a traveling paper web, a cigarette rod forming mechanism for fabricating said tobacco and said paper web into a continuous cigarette rod; mass sensing means including a radioactive source of penetrative radiation and a radiation detector, said mass sensing means being mounted adjacent the cigarette rod output side of said rod forming mechanism, a shutter having at least one portion substantially opaque to said radiation, actuating means for moving said shutter between a first position intercepting said radiation and a second position withdrawn from said radiation; cutter means for severing individual cigarettes from said cigarette rod; radiation means mounted adjacent said cutter means for directing a radiation beam toward the path of said individual cigarettes to generate pulsating radiation as a result of the periodic effect of said individual cigarettes on said radiation beam, a detector for detecting said pulsating radiation to generate a pulsating electrical voltage having a pulsation rate proportional to the rate of discharge of said individual cigarettes from said cutter means, and means connecting said pulsating electrical voltage to said actuating means.*

*16. Cigarette making apparatus comprising supply means for feeding a continuous stream of shredded tobacco onto a traveling paper web, a cigarette rod forming mechanism for fabricating said tobacco and said paper web into a continuous cigarette rod; mass sensing means including a radioactive source of penetrative radiation and a radiation detector, said mass sensing means being mounted adjacent the cigarette rod output side of said rod forming mechanism, a shutter having at least one portion substantially opaque to said radiation, actuating means for moving said shutter between a first position intercepting said radiation and a second position withdrawn from said radiation; cutter means for severing individual cigarettes from said cigarette rod; light source means mounted adjacent said cutter means for directing a light beam toward the path of said individual cigarette to generate pulsating light radiation as a result of the periodic effect of said individual cigarettes on said light beam, a photoelectric detector for detecting said pulsating light radiation to generate a pulsating electrical voltage having a pulsation rate proportional to the rate of discharge of said individual cigarettes from said cutter means, and means connecting said pulsating electrical voltage to said actuating means.*

*17. Cigarette making apparatus comprising supply means for feeding a continuous stream of shredded tobacco onto a traveling paper web, a cigarette rod forming mechanism for fabricating said tobacco and said paper web into a continuous cigarette rod; mass sensing means including a radioactive source of penetrative radiation and a radiation detector, said mass sensing means being mounted adjacent the cigarette rod output side of said rod forming mechanism, control means connected to said detector for controlling the amount of tobacco in said rod, a shutter having at least one portion substantially opaque to said radiation, actuating means for moving said shutter between a first position intercepting said radiation and a second position withdrawn from said radiation, said actuating means connected to said control means; means for generating a fluctuating electrical voltage indicative of the formation of said cigarette rod, and means connecting said fluctuating electrical voltage to said actuating means.*

*18. Continuous processing apparatus comprising supply means for supplying a continuous stream of material, a product forming mechanism for receiving said stream and fabricating said material into a continuous product, mass sensing means including a radioactive source of penetrative radiation and a radiation detector, said mass sensing means being mounted adjacent the product on the product output side of the product forming mechanism, a shutter having at least one portion substantially opaque to said radiation, actuating means for moving said shutter to a first position intercepting said radiation from a second position withdrawn from said radiation, means for generating an electrical voltage indicative of the formation of said product, and means connecting said electrical voltage to said actuating means for*

*operating said actuating means when the rate of travel of said product falls below a predetermined minimum.*

*19. Continuous process apparatus comprising supply means for supplying a continuous stream of material, a product forming mechanism for receiving said stream and fabricating said material into a continuous product, mass sensing means including a radioactive source of penetrative radiation and a radiation detector, said mass sensing means being mounted adjacent the product on the product output side of the product forming mechanism, a shutter having at least one portion substantially opaque to said radiation, actuating means for moving said shutter to a first position intercepting said radiation from a second position withdrawn from said radiation, means*

*for generating an electrical voltage indicative of the formation of said product, and means connecting said electrical voltage to said actuating means for operating said actuating means in the absence of said product.*

References Cited in the file of this patent or the original patent

UNITED STATES PATENTS

| | | |
|---|---|---|
| 2,433,560 | Hurley | Dec. 30, 1947 |
| 2,574,595 | Shaw | Nov. 13, 1951 |
| 2,704,079 | Molins et al. | Mar. 15, 1955 |
| 2,729,213 | Broekhuysen et al. | Jan. 3, 1956 |
| 2,729,214 | Broekhuysen et al. | Jan. 3, 1956 |
| 2,737,186 | Molins et al. | Mar. 6, 1956 |
| 2,800,131 | Molins et al. | July 23, 1957 |